United States Patent Office 3,266,962
Patented August 16, 1966

3,266,962
METHOD OF ETCHING ELECTRODE FOILS FOR ELECTROLYTIC CAPACITORS
Wolfgang Post, Singen am Hohentwiel, Germany, assignor to Schweizerische Aluminium AG (Aluminium Suisse S.A.) (Alluminio Svizzero S.A.) (Swiss Aluminium Ltd.)
No Drawing. Filed Aug. 28, 1962, Ser. No. 220,041
Claims priority, application Switzerland, Aug. 30, 1961, 10,104/61
2 Claims. (Cl. 156—22)

The present invention relates to electrode foils for electrolytic capacitors and to the present process of making the same.

It is known to increase the active surfaces of electrode foils for electrolytic capacitors by etching to increase the capacity or to decrease the volume of the capacitor. For that purpose, some chemical and electrochemical processes have been developed for etching the film forming metals, especially aluminum and tantalum, used as electrodes in electrolytic capacitors. These processes have the purpose of roughening the metal surface as much as possible to give the highest possible surface increase.

It has been proposed to etch the electrode foils to such an extent that they become porous and permeable to light, so that they are traversed by small holes or pores through which light will shine if the foils are held against a source of light. It has been found that these porous light transmitting foils do not show the highest surface increase.

One object of the present invention is to provide a new and improved process for making etched electrode foils affording comparatively large surface increase and to an etched electrode foil made by this process.

It has been determined in accordance with the present invention that maximum increase in the surface of an electrode foil is attained if the etched foil is crossed by small irregular tunnels making the foil permeable to liquids but preventing light from being transmitted through the foil. In the manufacture of such foils, the etching must be interrupted at a point when the foil is permeable to liquid but not yet to light. Also, no diffuse light gleam should penetrate the foil if it is exposed to an intensive light source.

The etching process is considered to proceed as follows: During etching, the attack is directed at certain points and penetrates deeper and deeper into the foil as the etching proceeds. In the early periods of etching, there are generated minute pores or tunnels which traverse the foil in oblique directions with respect to the plane of the foil and in curved directions generally along grain boundaries. As soon as these pores or tunnels cross the foil from one side to the other, the foil becomes permeable to liquids but not yet to light, because the tunnels are not rectilinear. At this instant, the surface increase is at its highest. If the etching is permitted to proceed beyond this point, the pores or tunnels are broadened, especially at their ends on both sides of the foil. When the widening has proceeded so far that the light may pass through the foil along rectilinear paths, then the active surface of the resulting light permeable foil has at that moment passed its maximum and decreases.

The foil is considered to be permeable to liquids if after applying a drop of liquid on one side of the foil, the other side becomes moist or if after applying colored liquid to one side of the foil, the color appears on the other side. For carrying out the test to determine liquid permeability, liquids such as water, aqueous solutions of glycol or electrolyte solutions, such as those used in electrolytic capacitors may be employed.

The principle of the invention is illustrated by the following example, in which the electrode foil is etched by a two-step process:

An aluminum foil of 99.85% purity and 0.09 mm. thickness was pickled in a 15% sodium hydroxide solution and then etched in the first step for 45 seconds at a temperature of 60° C. by immersion in a bath of 10% hydrochloric acid solution containing dissolved 10 g./l. of aluminum and 10 g./l. of ferric chloride. For the second etching step, an etching solution of 10% hydrochloric acid containing dissolved 10 g./l. aluminum at a temperature of 45° C. was employed as the etching bath. The duration of etching in this second step was varied to produce different results in surface increase, as will be described.

After etching in the second step for 15 seconds, the foil was not permeable either to liquids or to light. The reason for this impermeability was that the tunnels etched in the foil were not crossing the full thickness of the foil. The measurement of the capacity of this foil as an electrode in an electrolytic capacitor gave at 6 volts a value of 1200 $\mu$f./dm.$^2$ and at 540 volts a value of 8.6 $\mu$f./dm.$^2$.

After etching in the second step for 45 seconds, the foil was permeable to water but not yet to light. The values of the capacity measurement of this foil at 6 volts was 1500 $\mu$f./dm.$^2$ and at 540 volts was 11.1 $\mu$f./dm.$^2$.

After etching in the second step for 75 seconds, the foil was permeable to light as well as water. The values of the capacity measurements of this foil at 6 volts was 1300 $\mu$f./dm.$^2$ and at 540 volts was 9.5 $\mu$f./dm.$^2$.

A smooth unetched aluminum foil yielded capacity values of 80 $\mu$f./dm.$^2$ and 2.3 $\mu$f./dm.$^2$ at 6 volts and 540 volts respectively.

The results of the test carried out under the foregoing example indicate that the maximum surface increase is reached after etching to such an extent that the foil is permeable to liquids but not yet to light.

The conditions required to attain the highest surface increase in accordance with the present invention is applicable to all etching processes, both chemical or electrochemical, whether continuous in one step or discontinuous in two or more steps, and is applicable to all film or foil forming metals. In order to reach the required permeability to liquids while maintaining impermeability to light, the etching time, the concentration of etching solution and/or the temperature must be considered and varied with respect to the corresponding conditions of known processes leading to the production of foils which are impermeable to both liquid and light and foils which are permeable to both liquid and light. In every case, the etching must be carried out under conditions which will produce pores or tunnels extending through the foil so that liquid will pass therethrough but not rectilinearly therethrough, so that light will not pass through the foil.

In the following claims, by "etch bath" is meant a bath which etches purely through chemical action or through electrochemical action.

While the invention has been described with particular reference to a specific embodiment, it is to be understood that it is not to be limited thereto but is to be construed broadly and restricted solely by the scope of the appended claims.

What is claimed is:
1. A process of making etched electrode metal foils with an increased active surface area for electrolytic capacitors, which comprises etching a metal foil in an etch bath, subjecting the foil to liquid and light permeability tests, and terminating the etching step when the tests indicate that the foil is permeable to liquid but impermeable to light.

2. A process of making etched electrode metal foils with an increased active surface area for electrolytic capacitors, which comprises etching a metal foil in an etch bath under conditions to cause said foil to reach a state where said foil is traversed by minute tunnels across the full thickness of the foil, whereby the foil is permeable to liquid, and where said tunnels are non-rectilinear, whereby the foil is impermeable to light, subjecting the foil to liquid and light permeability tests to determine when the foil reaches said state, and terminating the etching step when the tests indicate that the foil is permeable to liquid but impermeable to light.

References Cited by the Examiner

UNITED STATES PATENTS

| | | | |
|---|---|---|---|
| 2,080,390 | 5/1937 | Booe | 317—230 |
| 2,154,027 | 4/1939 | Brennan | 156—23 |
| 2,180,798 | 11/1939 | Collins | 156—23 |
| 2,699,382 | 1/1955 | Altenpohl | 156—22 |

FOREIGN PATENTS 966,928   9/1957   Germany.

ALEXANDER WYMAN, *Primary Examiner.*

JACOB STEINBERG, EARL M. BERGERT,
*Examiners.*